US011745269B2

(12) United States Patent
Huber et al.

(10) Patent No.: US 11,745,269 B2
(45) Date of Patent: Sep. 5, 2023

(54) PEELING PLATE

(71) Applicant: CERATIZIT AUSTRIA GESELLSCHAFT M.B.H., Reutte (AT)

(72) Inventors: Ronald Huber, Vils (AT); Harald Urschitz, Breitenwang (AT)

(73) Assignee: Ceratizit Austria Gesellschaft m.b.H., Reutte (AT)

( * ) Notice: Subject to any disclaimer, the term of this patent is extended or adjusted under 35 U.S.C. 154(b) by 0 days.

(21) Appl. No.: 16/080,088

(22) PCT Filed: Feb. 21, 2017

(86) PCT No.: PCT/AT2017/000008
§ 371 (c)(1),
(2) Date: Aug. 27, 2018

(87) PCT Pub. No.: WO2017/143368
PCT Pub. Date: Aug. 31, 2017

(65) Prior Publication Data
US 2019/0054542 A1    Feb. 21, 2019

(30) Foreign Application Priority Data
Feb. 26, 2016  (AT) .................................. GM 40/2016

(51) Int. Cl.
*B23B 5/12*      (2006.01)
*B23B 27/16*     (2006.01)

(52) U.S. Cl.
CPC ............ *B23B 5/12* (2013.01); *B23B 27/1603* (2013.01); *B23B 2200/0404* (2013.01);
(Continued)

(58) Field of Classification Search
CPC ...... B23C 2210/205; B23C 2200/0405; B23C 2200/0411; B23C 5/08; B23C 5/202;
(Continued)

(56) References Cited

U.S. PATENT DOCUMENTS 4,971,483 A    11/1990  Kress et al.
5,246,315 A *  9/1993   Hansson ................... B23B 5/12
                                                                    407/69
(Continued)

FOREIGN PATENT DOCUMENTS

AT          501655 A1    10/2006
CA         2419760 A1 *   2/2002  ............. B23C 5/205
(Continued)

*Primary Examiner* — Ryan Rufo
(74) *Attorney, Agent, or Firm* — Laurence A. Greenberg; Werner H. Stemer; Ralph E. Locher

(57) ABSTRACT

A peeling plate has upper and lower sides, lateral faces extending between the upper and lower sides, and primary and secondary cutting edges at the transition from the lateral faces to the upper side. The peeling plate in a plan view of the upper side has the shape of a substantially regular n-gon, n being five or six, and n lateral edges lying between the n lateral faces. A primary cutting edge and a secondary cutting edge are formed at the transition from at least one lateral face to the upper surface, wherein active primary cutting edges and active secondary cutting edges are spaced apart from a lateral edge. The lateral edge at the transition to the upper side forming an active cutting corner to the respective active primary cutting edge and active secondary cutting edge.

11 Claims, 7 Drawing Sheets

(52) U.S. Cl.
CPC . *B23B 2200/0457* (2013.01); *B23B 2200/201* (2013.01); *B23B 2220/40* (2013.01); *B23B 2220/445* (2013.01)

(58) Field of Classification Search
CPC . B23C 5/207; B23C 5/109; B23C 2200/0444; B23C 2200/208; B23B 5/12; B23B 2200/0404; B23B 2200/0409; B23B 2200/0414; B23B 2200/0457; B23B 2220/40; B23B 2220/445; B23B 2200/208
See application file for complete search history.

(56) References Cited

U.S. PATENT DOCUMENTS

| | | | | |
|---|---|---|---|---|
| 6,079,912 | A * | 6/2000 | Rothballer | B23C 5/2213 |
| | | | | 407/114 |
| 6,641,337 | B1 | 11/2003 | Rothballer | |
| 7,972,092 | B2 | 7/2011 | Baernthaler et al. | |
| 9,527,141 | B2 | 12/2016 | Inagaki et al. | |
| 2002/0028116 | A1* | 3/2002 | Morgulis | B23C 5/202 |
| | | | | 407/67 |
| 2002/0102139 | A1* | 8/2002 | Svensson | B23C 5/207 |
| | | | | 407/43 |
| 2007/0071559 | A1* | 3/2007 | Koskinen | B23B 27/16 |
| | | | | 407/34 |
| 2007/0297865 | A1* | 12/2007 | Hessman | B23C 5/207 |
| | | | | 407/114 |
| 2008/0260475 | A1* | 10/2008 | Bodewig | B23C 5/207 |
| | | | | 407/42 |
| 2010/0129167 | A1* | 5/2010 | Morrison | B23B 27/141 |
| | | | | 407/114 |
| 2010/0202839 | A1* | 8/2010 | Fang | B23C 5/202 |
| | | | | 407/53 |
| 2010/0221076 | A1* | 9/2010 | Takahashi | B23C 5/202 |
| | | | | 407/42 |
| 2011/0135407 | A1* | 6/2011 | Koga | B23C 5/06 |
| | | | | 407/40 |
| 2012/0045289 | A1* | 2/2012 | Ishi | B23C 5/06 |
| | | | | 409/132 |
| 2012/0070240 | A1 | 3/2012 | Ishi et al. | |
| 2012/0093596 | A1* | 4/2012 | Ishi | B23C 5/06 |
| | | | | 407/113 |
| 2012/0155976 | A1* | 6/2012 | Ishi | B23C 5/06 |
| | | | | 407/66 |
| 2012/0189396 | A1* | 7/2012 | Xu | B23C 5/06 |
| | | | | 409/132 |
| 2013/0129430 | A1* | 5/2013 | Bhagath | B23B 27/007 |
| | | | | 407/33 |
| 2013/0223942 | A1* | 8/2013 | Matsuo | B23C 5/109 |
| | | | | 407/42 |
| 2014/0044496 | A1* | 2/2014 | Shankaregowda | B23C 5/207 |
| | | | | 407/40 |
| 2014/0076117 | A1* | 3/2014 | Shibata | B23C 5/06 |
| | | | | 83/13 |
| 2014/0212229 | A1* | 7/2014 | Diepold | B23C 5/202 |
| | | | | 407/42 |
| 2015/0190867 | A1* | 7/2015 | Roman | B23C 5/207 |
| | | | | 407/42 |
| 2015/0190869 | A1* | 7/2015 | Roman | B23C 5/207 |
| | | | | 407/42 |
| 2016/0288224 | A1* | 10/2016 | Ishi | B23C 5/06 |
| 2017/0320145 | A1* | 11/2017 | Pettersson | B23C 5/06 |
| 2017/0341154 | A1* | 11/2017 | Kiemele | B23B 27/145 |

FOREIGN PATENT DOCUMENTS

| | | | | |
|---|---|---|---|---|
| CA | 2765664 | A1 * | 12/2010 | ............ B23C 5/20 |
| CN | 102427904 | A | 4/2012 | |
| DE | 9320448 | U1 * | 7/1994 | ........... B23C 5/2221 |
| DE | 4419094 | A1 * | 8/1995 | ........... B23C 5/2213 |
| DE | 19703569 | A1 | 10/1997 | |
| DE | 29815761 | U1 | 2/2000 | |
| DE | 20014428 | U1 | 1/2002 | |
| EP | 0361031 | A1 | 4/1990 | |
| EP | 2732891 | A1 | 5/2014 | |
| EP | 3530391 | A1 * | 8/2019 | ............ B23C 5/006 |
| RU | 2201316 | C2 | 3/2003 | |
| WO | WO-2007104275 | A1 * | 9/2007 | ........... B23C 5/2208 |
| WO | WO-2007142224 | A1 * | 12/2007 | ............ B23C 5/06 |
| WO | WO-2010150907 | A1 * | 12/2010 | ............ B23C 5/06 |
| WO | 2011092883 | A1 | 8/2011 | |
| WO | WO-2013077442 | A1 * | 5/2013 | ........... B23C 5/2221 |
| WO | WO-2013077443 | A1 * | 5/2013 | ............ B23C 5/06 |

* cited by examiner

Section A-A

PEELING PLATE

BACKGROUND OF THE INVENTION

Field of the Invention

The invention relates to a peeling plate having an upper side and a lower side, lateral faces that extend between the upper side and the lower side, and primary cutting edges and secondary cutting edges formed at the transition from the lateral faces to the upper side. The invention further relates to an assembly of a tool holder and at least one peeling plate.

Bar peeling is a subtractive machining method for removing external material layers of rolled or forged blanks having a round cross section. In bar peeling the workpiece, typically a bar or a thick-walled tube, in a manner centered by rollers is guided through a rotating tool, the peeling head.

The peeling head has at least three, typically four to eight, tool holders or slides, each having one to three cutting inserts. The tool holders or slides can be configured with or without so-called cartridges. The cutting inserts used in bar peeling are referred to as peeling plates.

The peeling plates in bar peeling are usually disposed such that so-called roughing plates (also referred to as preliminary cutters) at the infeed side assume the task of rough removal of material, i.e. the roughing, and so-called finishing plates (also referred to as finishing cutters or post cutters) ensure a high surface quality, accuracy of shape, and dimensional accuracy. The finishing plates in relation to the advancing direction are disposed after the roughing plates.

Thus dedicated peeling plates which separately assume said tasks are typically provided in a tool holder. Finishing plates can be dispensed with for many applications, such as when no particular requirements are set for the surface quality.

Round peeling plates, thus cutting inserts having a circular design in the plan view, are often used for roughing. The susceptibility to the peeling plates rotating in the plate seat and to the tension screw loosening in the case of round peeling plates is disadvantageous, this potentially leading to the loss of the peeling plate and optionally of a support plate during use. This loss leads to a total failure of the tool holder, this being associated with very high costs. The undulated surface that results on the workpiece is furthermore unfavorable in the case of round peeling plates.

Moreover, peeling plates which have both primary cutting edges as well as secondary cutting edges are known. The primary cutting edge herein assumes the task of the rough removal of material, i.e. the roughing: the secondary cutting edge carries out the finishing, thus ensuring a high surface quality, accuracy of shape, and dimensional accuracy. A polygonal peeling plate having a primary cutting edge and a secondary cutting edge which in relation to the latter is disposed at a flat angle is thus known from AT 501655 A1, for example. The active primary cutting edges and secondary cutting edges herein lie in each case on a lateral face of the polygonal peeling plate. A maximum achievable chip removal depth is very minor in the case of these plates.

SUMMARY OF THE INVENTION

It is an object of the present invention to specify an improved peeling plate. The improved peeling plate is intended in particular to permit a large maximum chip removal depth and at the same time achieve a high surface quality.

The objects are achieved by a peeling plate as claimed, and by an assembly as claimed. Advantageous embodiments are specified in the dependent claims.

A peeling plate according to the invention has:
- an upper side and a lower side,
- lateral faces that extend between the upper side and the lower side,
- primary cutting edges and secondary cutting edges that are configured at the transition from the lateral faces to the upper side,
- wherein the peeling plate in a plan view of the upper side has the shape of a substantially regular n-gon, n being five or six, and n lateral edges lying between the n lateral faces, wherein a primary cutting edge and a secondary cutting edge are configured at the transition from at least one lateral face to the surface, wherein active primary cutting edges and active secondary cutting edges are spaced apart from a lateral edge, said lateral edge at the transition to the upper side forming an active cutting corner to the respective active primary cutting edge and active secondary cutting edge.

This is thus a peeling plate having a pentagonal or hexagonal basic design.

The hexagonal basic design is preferable.

"Active" primary cutting edge, or "active" secondary cutting edge, respectively means that these primary cutting edges or secondary cutting edges, respectively, are specified for simultaneous use, that is to say that said primary cutting edges or secondary cutting edges, respectively, in the use of the cutting insert are simultaneously utilized for material machining.

The active primary cutting edge herein assumes the task of the rough removal of material, i.e. the roughing, while the active secondary cutting edge polishes the surface of the machined workpiece and thus ensures a high surface quality, accuracy of shape, and dimensional accuracy.

The active primary cutting edge and the active secondary cutting edge that are used simultaneously for material machining are not configured on the same lateral face but are located on two neighboring lateral faces and are spaced apart from a cutting corner. The cutting corner that lies between an active primary cutting edge and an active secondary cutting edge is referred to as the active cutting corner.

In use, the peeling plate in relation to a workpiece to be subtracted, such as a round bar, is set such that the orbit of the active secondary cutting edge runs substantially parallel with a longitudinal axis of the workpiece. The orbit of the secondary cutting edge thus represents a cylindrical shell that is substantially concentric with the longitudinal axis of the workpiece. The orbit of the primary cutting edge is substantially of a truncated cone shape. The active primary cutting edge, in a plan view of the peeling plate, sits ahead of the active secondary cutting edge in the clockwise direction and at the infeed side. The assembly could also be in a mirror image for clockwise applications.

The chip removal depth is chosen such that the active primary cutting edge plunges into the material to be subtracted only so far that the passive secondary cutting edge that adjoins the active primary cutting edge on the lateral face of said active primary cutting edge does not engage with the material. This is of importance in order for the passive secondary cutting edge not to be damaged. After all, this passive secondary cutting edge in the case of another indexing acts as an active secondary cutting edge. More specifically, this passive secondary cutting edge in the indexing performed by the rotation of the peeling plates by 60° in a counter clockwise manner in the case of a hexagonal plate, or by 72° in the case of a pentagonal plate, becomes the active secondary cutting edge of this new indexing position. The maximum chip removal depth of the peeling plate is derived from this stipulation.

It is preferably provided that in each case one primary cutting edge and one secondary cutting edge are configured at the transition from each lateral face to the surface. The cutting insert thus preferably has five (for a pentagonal plate) or six (for a hexagonal plate), respectively, pairs of primary cutting edges and secondary cutting edges along the upper side.

The cutting insert in this instance in relation to the upper side is capable of being indexed five or six times, respectively. A new indexing position in the case of a pentagonal basic shape of the peeling plate results in every 72°, every 60° in the case of a hexagonal basic shape.

It is preferably provided that the secondary cutting edges have a length of ⅙ to ½ of the length of the primary cutting edges.

It is thus achieved that only a minor proportion of the available cutting-edge length of the secondary cutting edge is consumed at the transition from a lateral face to the upper side.

A correspondingly longer primary cutting edge and, resulting therefrom, a larger maximum chip removal depth, is thus available for the roughing. By contrast, in the case of peeling plates known from the prior art the primary cutting edge is configured so as to be substantially shorter than the secondary cutting edge. This reversal of the conditions known from the prior art pertaining to peeling plates permits a large maximum chip removal depth to be achieved by way of the peeling plates according to the invention in the machining of a workpiece, while at the same time achieving a high surface quality.

It is preferably provided that the primary cutting edges and/or the secondary cutting edges are configured as linear portions. Alternatively, in particular the secondary cutting edge can be embodied so as to be curved in a convex manner. As opposed to the roughing plates known from the prior art, or to preliminary cutters having round cutting edges which generate an undulated profile on the workpiece surface, thanks to the present peeling plate an already uniform surface without an undulated profile results from the roughing process that is carried out by the primary cutting edge. This leads to more homogenous application conditions for the secondary cutting edge that follows in relation to the advancing direction of the primary cutting edge, or for an optionally following finishing plate, respectively.

It is preferably provided that at least one first part-face which conjointly with the upper side forms a secondary cutting edge is configured on at least one lateral face, and that at least one further part-face which conjointly with the upper side forms at least part of a primary cutting edge is configured on the at least one lateral face, and wherein the first part-face conjointly with the further part-face encloses an external angle of greater than 180° and smaller than 210°, preferably an angle of 190°. The maximum external angle of the part-faces (facets) for pentagonal peeling plates is 216°.

The first part-face forms the tool flank of the secondary cutting edge, the further part-face forms at least part of the tool flank of the primary cutting edge. On account of the mutual tilting of the part-faces it is ensured in the use of the secondary cutting edge (that is to say the secondary cutting edge is active) that the passive primary cutting edge that adjoins the active secondary cutting edge on the same lateral face does not engage into the material. An external angle of 190° corresponds to a clearance angle of 10° between the part-faces. The part-faces form facets of a lateral face, so to speak. The part-faces are mutually delimited by part-face transitions, wherein the part-face transitions run parallel with the symmetry axis of the peeling plate and are preferably not sharp-edged but have a radius of, for example, 5 mm.

It is preferably provided that for a hexagonal basic shape those part-faces that conjointly with the upper side form at least part of a primary cutting edge and that are mutually spaced apart from a lateral edge are in each case disposed at a mutual internal angle of 60°. Said internal angle for a pentagonal basic shape is 72°.

This means that fresh indexing is achieved by rotating the peeling plate by 60° or 72°, respectively.

In one preferred embodiment the peeling plate is embodied so as to be double-sided. Double-sided means that cutting edges are configured both at the transition from lateral faces to the upper side as well as at the transition from lateral faces to the lower side. The primary cutting edges and secondary cutting edges that are configured at the transition from the lateral faces to the upper side become usable by reversing the peeling plate.

Reversing in the context of this disclosure means a rotation of the peeling plate by 180° in relation to a rotation axis that is perpendicular to the symmetry axis.

It is preferably provided that a primary cutting edge that is assignable to the lower side and a secondary cutting edge that is assignable to the lower side are configured at the transition from at least one lateral face to the lower side. The peeling plate in the case of a hexagonal basic shape preferably has six primary cutting edges that are assignable to the lower side and six secondary cutting edges that are assignable to the lower side. These are in each case five cutting edges in the case of a pentagonal basic shape. If in each case one primary cutting edge and one secondary cutting edge are configured also at the transition from each lateral face to the upper side in the case of a hexagonal basic shape, a peeling plate that is capable of being indexed 12 times is thus obtained. In this instance, 12 mutually independent pairs of primary cutting edges and secondary cutting edges thus can be used for machining. Pentagonal peeling plates are accordingly capable of being indexed 10 times.

It is preferably provided that a primary cutting edge that is assignable to the lower side is configured at the transition from the first and from the further part-face to the lower side, and a secondary cutting edge that is assignable to the lower side is configured at the transition from a third part-face to the lower side.

In other words, the peeling plate preferably has in each case three part-faces on the lateral faces.

This can be explained in that portions of the part-faces which in the non-reversed position of the peeling plate form tool flanks to the primary cutting edges that are assigned to the upper side, by reversing the peeling plate in the reversed state act as tool flanks to the secondary cutting edges that are assigned to the lower side.

It is preferably provided that a chip geometry is configured on the upper side and/or the lower side at least in the region of the primary cutting edges and/or the secondary cutting edges.

It is preferably provided that the transition of the part-faces on a lateral face is configured so as to be rounded having a curvature radius between 1 and 20 mm, preferably having a curvature radius of 5 mm.

Protection is also claimed for an assembly of at least one peeling plate having a tool holder of a peeling tool. The positioning of the peeling plate on the tool holder is preferably performed such that the active secondary cutting edge is set so as to be substantially parallel with the workpiece surface.

BRIEF DESCRIPTION OF THE SEVERAL VIEWS OF THE DRAWING

The invention will be explained in more detail hereunder by means of the figures in which.

DESCRIPTION OF THE INVENTION

Figure 1:
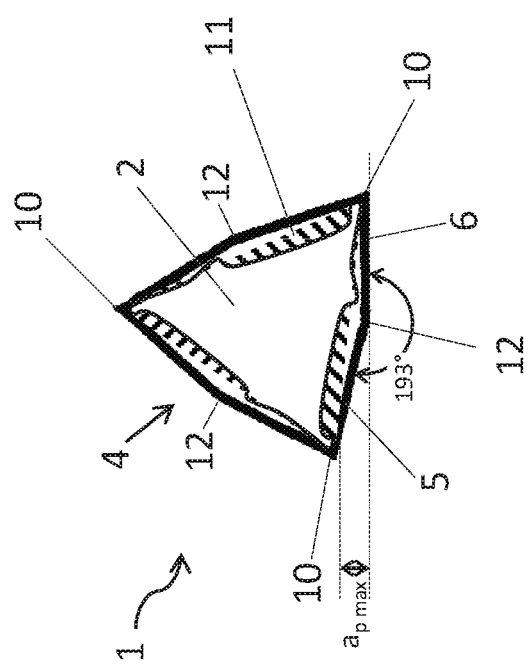
FIG. 1 shows a peeling plate according to the prior art.

FIG. 1 shows a peeling plate 1 according to the prior art in a plan view of an upper side 2.

The peeling plate 1 in the plan view of the upper side 2 has a basic shape of an equilateral triangle having three lateral edges 10 (here projecting). Primary cutting edges 5 and secondary cutting edges 6 are configured at the transition from the lateral faces 4 to the upper side 2. In use, the primary cutting edges 5 and secondary cutting edges 6 that are in each case assigned to one lateral face 4 are active. Primary cutting edges 5 and secondary cutting edges 6 of one lateral face 4 enclose a cutting corner 12. Chip geometries 11 are configured on the upper side 2.

The lateral faces 4 are arranged in such a manner that the primary cutting edge 5 conjointly with the secondary cutting edge 6 encloses a flat angle. In the present example the primary cutting edge 5 and the secondary cutting edge 6 are at a mutual external angle of approximately 193°.

The maximum chip removal depth $a_{p\ max}$ of the primary cutting edge 5 is indicated by the auxiliary lines. Due to the flat angle between the primary cutting edge 5 and the secondary cutting edge 6 only minor maximum chip removal depths $a_{p\ max}$ can be achieved.

Figure 2:
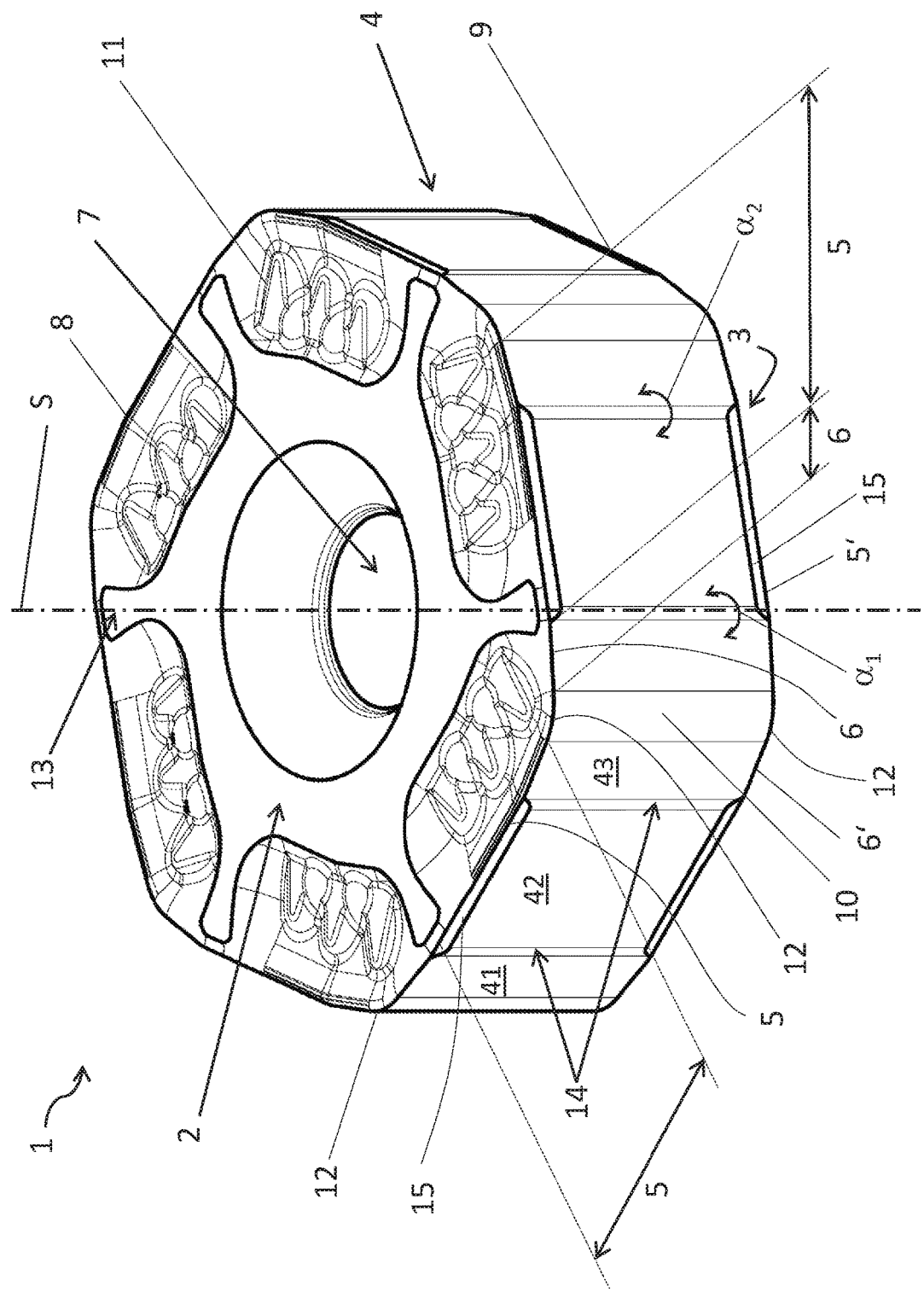
FIG. 2 shows a peeling plate according to the invention in a perspective view.

FIG. 2 shows a peeling plate 1 in an exemplary embodiment according to the invention in a perspective view. The peeling plate 1 in a plan view of the upper side 2 has the design of a substantially regular hexagon. There exists a six-fold symmetry in relation to a symmetry axis S. While a peeling plate 1 having a hexagonal basic shape is discussed hereunder, similar conditions apply to a peeling plate 1 having a pentagonal basic shape.

The peeling plate 1 has an upper side 2, a lower side 3, and lateral faces 4 that extend between the upper side 2 and the lower side 3. The lateral faces 4 on the circumference of the peeling plate 1 are spaced apart from lateral edges 10. The lateral edges 10 are preferably not configured as sharp edges but have a curvature radius of 5 mm, for example.

The lateral faces 4 preferably run parallel with the symmetry axis S. This causes a simple production capability by way of a powder-metallurgical production method, since a simple die can be used for pressing a powder mixture. The material of the peeling plate 1 is preferably a hard metal or another material that is producible by way of powder metallurgy.

A bore 7 by way of which the peeling plate 1 is capable of being fastened to a tool holder (not shown) by means of a tension screw and which penetrates the peeling plate 1 is provided so as to be concentrically parallel with the symmetry axis S. On account of a form-fitting plate seat, the peeling plate 1 in use can no longer be rotated and there is no risk of the tension screw being loosened in use. A loss of the peeling plate 1 is thus excluded.

A first cutting edge 8 is configured at the transition from the upper side 2 to the lateral faces 4.

The peeling plate 1 in the present exemplary embodiment is configured so as to be double-sided. A second cutting edge 9 is therefore configured at the transition from the lower side 3 to the lateral faces 4. Double-sided means that both the cutting edges 8, 9 between the upper side 2 and the lateral faces 4, as well as between the lower side 3 and the lateral faces 4, can be used for subtraction. Accordingly, in the use of portions of the cutting edge 8, the upper side 2 acts as the cutting face; in the case of a reversed peeling plate 1, that is to say in the use of portions of the cutting edge 9 for the removal of material, the lower side 3 acts as the cutting face. A cutting face is that face of a cutting edge on which a chip that is formed by a cutting edge runs off.

On account thereof, as opposed to a one-sided embodiment in which a cutting edge 8 is configured only between the upper side 2 and the lateral face 4, a substantially better utilization of the material of the cutting insert results. At least one support chamfer 15 is preferably configured at least in portions on the cutting edges 8, 9 toward the lateral faces 4. A support chamfer 15 causes a stable cutting performance and reduces the vibrations and the risk of breakouts on cutting edges.

The cutting edge 8 is subdivided into cutting edge portions in the form of primary cutting edges 5 and secondary cutting edges 6. Six primary cutting edges 5 that are assigned to the upper side 2, and six secondary cutting edges 6 are configured. Of course, fewer than six primary cutting edges 5 and secondary cutting edges 6 can also be implemented.

The cutting edges 10 at the intersection point with the upper side 2 form cutting corners 12.

Each primary cutting edge 5 conjointly with the secondary cutting edge 6 that is connected by way of a cutting corner 12 forms a pair of cutting edges which in the use of the peeling plate 1 simultaneously engage in a material to be subtracted (not shown).

In the use of the peeling plate 1 said peeling plate 1 in relation to a workpiece to be machined is positioned such that an active primary cutting edge 5 and the active secondary cutting edge 6 that neighbors the latter counter to the clockwise direction and is connected to the latter by way of an active cutting corner 12, engage in a workpiece. For applications having a rotation of the peeling plate 1 in the clockwise direction in relation to the workpiece the arrangement is correspondingly mirror-imaged.

The active secondary cutting edge 6 herein is substantially parallel with a longitudinal axis of the workpiece. The term "active cutting corner" refers to the transition between a primary cutting edge 5 and a secondary cutting edge 6, both being specified for simultaneous use, that is to say both being simultaneously used for machining the material in the use of the cutting insert. Accordingly, portions of the cutting edges are differentiated by "active" and "passive" cutting edges, depending on whether or not said cutting edges in the operation of the cutting insert are utilized for machining the material. The reference to the orientation "in the clockwise direction" refers to a viewing direction in the plan view of the upper side 2.

In the case of the present peeling plate 1, not the primary cutting edges 5 and secondary cutting edges 6 that are configured on one and the same lateral face 4 thus engage in the workpiece when in use, but an active primary cutting edge 5 conjointly with an active secondary cutting edge 6 that is configured on the neighboring lateral face 4 form the pair of simultaneously engaging cutting edges. The active cutting edges are thus spaced apart from a lateral edge 10.

As compared to peeling plates known from the prior art, in which primary cutting edges and secondary cutting edges provided for simultaneous use are configured on one and the same lateral face, this has the substantial advantage that a steeper angle can be implemented between the active secondary cutting edge 6 and the active primary cutting edge 5. This in turn, in the case of given dimensions of the cutting edges, permits a larger maximum cutting depth $a_{p\ max}$, since the maximum cutting depth $a_{p\ max}$ is the result of the product of the available cutting-edge length multiplied by sin (setting angle).

The primary cutting edge 5 herein carries out the rough subtraction operation, i.e. the roughing while the secondary cutting edge 6 that follows in the advancing direction assumes the finishing, thus the polishing.

The respective extents of a primary cutting edge 5 and of a secondary cutting edge 6 are identified by way of chain dotted auxiliary lines. The secondary cutting edges 6 herein are significantly shorter than the primary cutting edges 5. The secondary cutting edges 6 are ⅙ to ½ of the length of the primary cutting edges 5, for example.

Chip geometries 11 by way of which chips that are formed by the primary cutting edges 5 or the secondary cutting edges 6, respectively, are dischargeable are configured on the upper side 2. In the embodiment as a double-sided peeling plate 1, chip geometries 11 are configured in the same manner also on the lower side 3.

Furthermore to be seen are bearing faces 13, the upper side 2 in the region of said bearing faces 13 between the chip geometries 11 extending at the same level as about the bore 7 up to the periphery of the peeling plate 1. This has the advantage that in the case of the peeling plate 1 being clamped in a tool, supporting said peeling plate 1 is feasible up to the circumference of the peeling plate 1.

In order for a clearance angle to be achieved between a secondary cutting edge 6 and a primary cutting edge 5 that is assigned to the same lateral face 4, lateral faces 4 are subdivided into mutually tilted part-faces 41, 42. The part-faces 41, 42 are mutually set at an external angle α1 of, for example, 190°. This angle has the effect that a passive primary cutting edge 5 that in the counter clockwise direction neighbors an active secondary cutting edge 6 does not engage in the material.

For peeling plates 1 that are usable in a double-sided manner, a third part-face 43 which in relation to the further part-face 42 is likewise inclined by an external angle α2 is provided on the lateral faces 4. The external angle α2 preferably has the same value as the external angle α1. This can be explained in that portions of those part-faces 42, 43 which in the non-reversed position of the peeling plate form tool flanks to the primary cutting edge 5 that is assigned to the upper side 2, by reversing the peeling plate 1 in the reversed state act as tool flanks to the secondary cutting edge 6' that is assigned to the lower side 3. For use in the reversed position, the third part-face 43 conjointly with the lower side 3 forms a secondary cutting edge 6' that is assigned to the lower side 3.

The secondary cutting edges 6 that are assigned to the upper side 2 are configured between the part-faces 41 and the upper side 2. The primary cutting edges 5 that are assigned to the upper side 2 are configured at the transition from the part-faces 42, 43 to the upper side 2. The primary cutting edges 5 extend in each case, in a manner adjacent to the secondary cutting edges 6, up to the cutting corners 12.

The exemplary embodiment of FIG. 2 shows a peeling plate 1 that is usable in a double-sided manner. Primary cutting edges 5' and secondary cutting edges 6' that are assigned to the lower side 3 are configured at the transition from the lateral faces 4 to the lower side 3. Therefore, 12 pairs of primary cutting edges 5, 5', and of secondary cutting edges 6, 6' can be utilized. Reference is made of a cutting insert that is capable of being indexed 12 times.

It is preferably provided that the secondary cutting edges 6, 6' have a length of ⅙ to ½ of the length of the primary cutting edges 5, 5'. Accordingly, the lateral extents of the part-faces 41, 42, 43 are at a ratio of, for example, ⅙:⅚:⅙ (for a length of the secondary cutting edge of ⅙ of the primary cutting edge). The part-face 41 which conjointly with the upper side 2 forms a secondary cutting edge 6 is thus preferably of the same width as a part-face 43 which conjointly with the lower side 3 forms a secondary cutting edge 6' that is assigned to the lower side 3.

Figure 3:
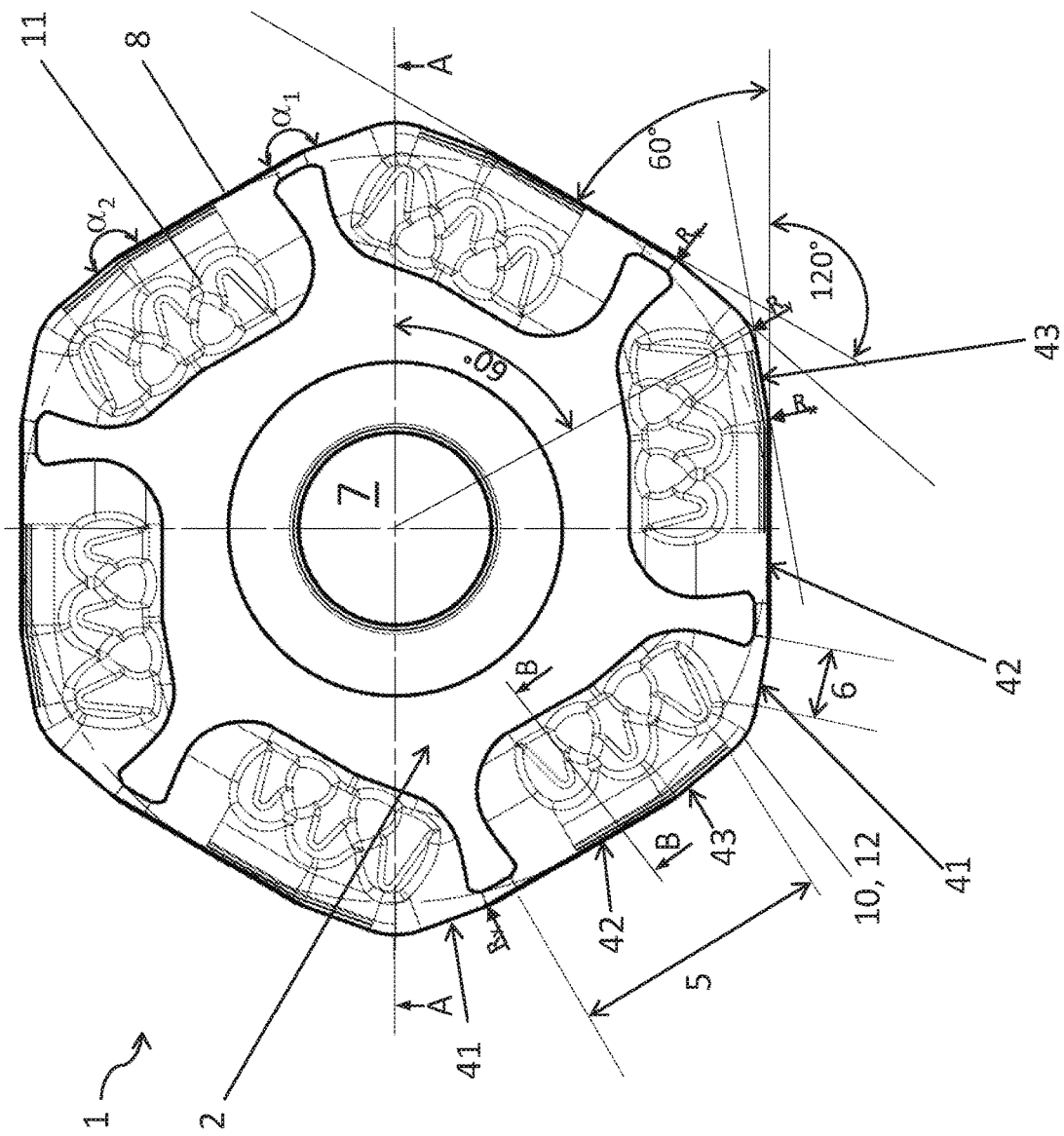
FIG. 3 shows a peeling plate according to the invention in the horizontal plan.

This becomes evident in a horizontal plan of the peeling plate 1 as is illustrated in FIG. 3.

The part-faces 41, 42, 43 are projecting in the horizontal plan. The part-face 41 is tilted by α1 in relation to the further part-face 42, the third part-face 43 is tilted by α2 in relation to the further part-face 42, wherein preferably α1=α2. In other words, the part-faces 41, 43 in relation to the part-face 42 have the same angle. The facet feature results in a convex design of the lateral faces 4.

The primary cutting edge 5 that is formed between the part-face 42, the part-face 43, and the upper side 2 in this case of a peeling plate 1 that is usable in a double-sided manner in a plan view of the peeling plate 1 shows a kinked profile.

The further part-faces 42 of the peeling plate are in each case at a mutual angle of 60° (measured between the plane normals of the part-faces 42). The peeling plate 1 has a six-fold symmetry.

The part-face transitions 14 between the part-faces 41, 42, 43 on a lateral face 4 are preferably not embodied as sharp edges but have a curvature radius $R_x$ of 5 mm, for example. The lateral edges 10 are likewise embodied in a rounded manner, having a curvature radius $R_y$, for example having a curvature radius $R_y$ of 5 mm.

In the case of a reversed peeling plate 1, that is to say the lower side 3 functioning as a cutting face, that portion of the cutting edge 9 that extends between the lower side 3 and the part-face 43 acts as the secondary cutting edge 6'. The primary cutting edge 5' and the secondary cutting edge 6' in this case form a pair of active cutting edges which are connected by way of the cutting corner 12. In the case of this advantageous embodiment of a double-sided peeling plate 1, in each case six pairs of primary cutting edges 5, 5' and secondary cutting edges 6, 6' can thus be utilized on the upper side 2 or the lower side 3, respectively.

If the peeling plate 1, in a manner deviating from the exemplary embodiment shown here, is embodied so as to be one-sided, a division of the lateral faces 4 into three part-faces is not required. In this case, a division into two part-faces 41 and 42 suffices in such a manner that an active secondary cutting edge 6 has an angle in relation to an adjoining passive primary cutting edge 5. Observing a lateral face 4, the part-face 42 in the case of an one-sided embodiment of the peeling plate 1 can extend up to the lateral edge 10. The primary cutting edge 5 that is formed between the part-face 42 and the upper side 2 in this case, in a plan view of the peeling plate 1, displays a linear profile.

Figure 4:
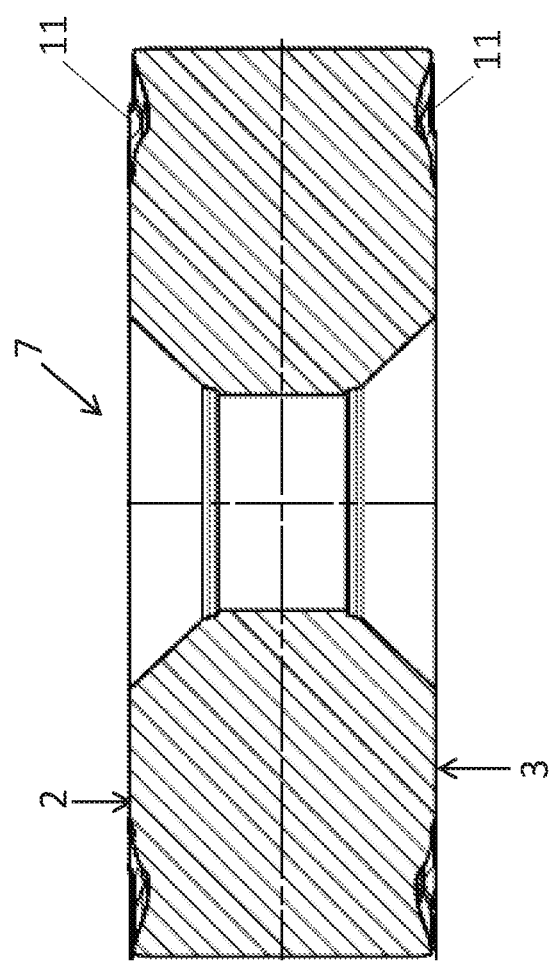
FIGS. 4-5 show a peeling plate according to the invention in the cross section.

FIG. 4 shows a peeling plate 1 according to the invention in the cross section along the section plane A-A indicated in FIG. 3. The chip geometries 11 on the upper side 2 and on the lower side 3 of the peeling plate 1 can be seen.

Figure 5:
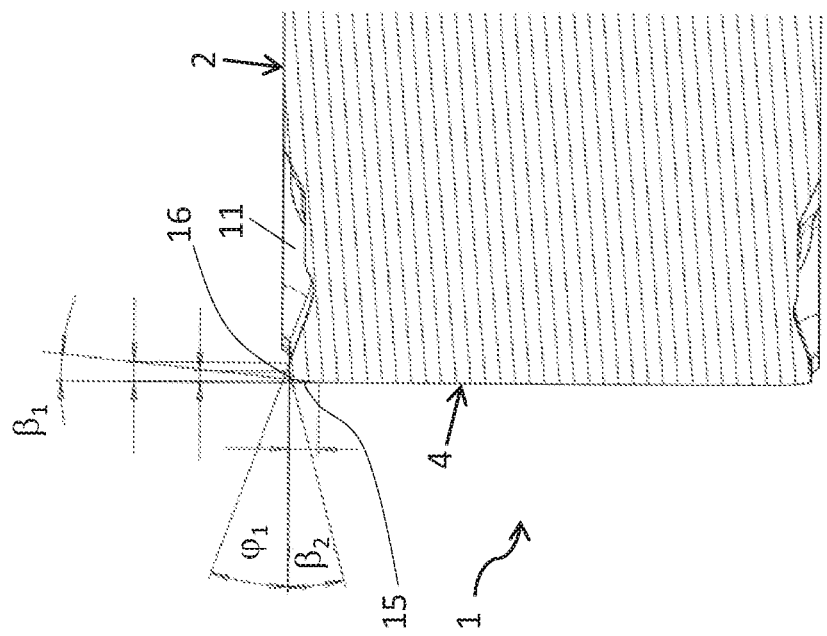

FIG. 5 shows a section of the peeling plate 1 along the section plane B-B indicated in FIG. 3.

On account of the position of the section, details of a support chamfer 15, or of a protective chamfer 16, respectively, in the region of the primary cutting edge 5 can be seen. A support chamfer 15 having a chamfer angle β1 of, for example, 3 to 7° exists on the external face 4. A protective chamfer 16 having a chamfer angle β2 of, for example, 5 to 20° is configured on the side of the cutting face on the upper side 2. Following a planar portion, the chip geometry 11 having a chip angle $\varphi_1$ of, for example, 5 to 30° in relation to the horizontal, enters so as to be configured as a depression in the upper side 2.

The angular ranges are mentioned in an exemplary manner and are not to be understood as limiting.

The variable placement of support chamfers 15 or protective chamfers 16, respectively, in different portions of the cutting edge is a particular advantage of the peeling plates 1 according to the invention as compared to round peeling plates. For example, a chamfer angle of the support chamfer 15 or of the protective chamfer 16, respectively, can thus be implemented in a region of a primary cutting edge 5 that is different from said chamfer angle in a region of a secondary cutting edge 6.

Figure 6:
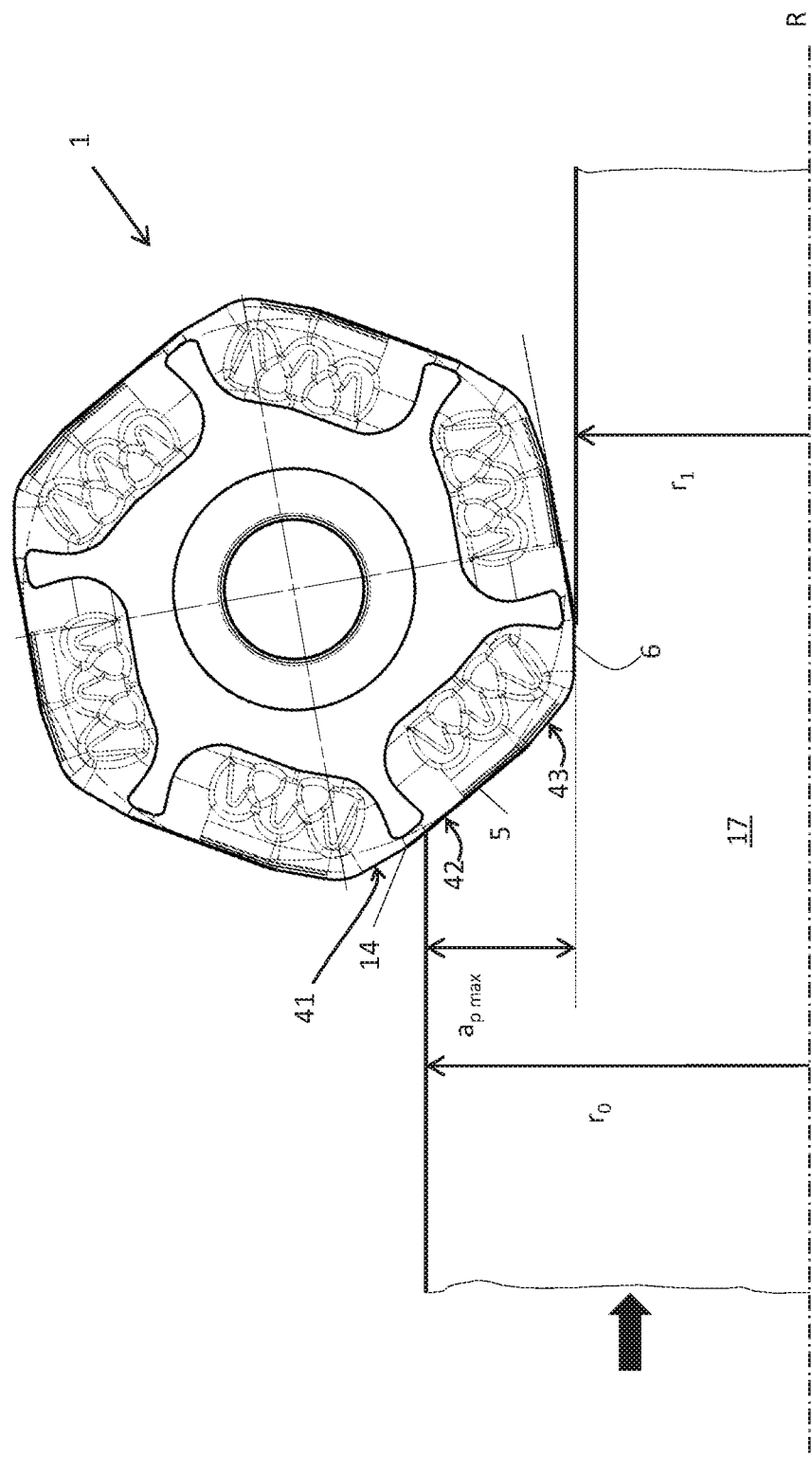
FIG. 6 shows a peeling plate according to the invention engaging in a workpiece.

FIG. 6 shows a peeling plate 1 according to the invention engaging in a cylindrically symmetrical workpiece 17.

A tool (not shown) that supports the peeling plate 1 rotates about a rotation axis R. The rotation direction points perpendicularly out of the image plane toward the observer. An advancing direction of the workpiece 17 is indicated by a block arrow. It goes without saying that the machining depends on the relative movement between the tool and the workpiece 17. A rotation of the workpiece 17 and an advancement of the tool could thus also be implemented. The workpiece 17 has an initial radius $r_0$ and a radius $r_1$ after machining.

The secondary cutting edge 6 is set so as to be substantially parallel with the rotation axis R. In other words, the orbit of the secondary cutting edge 6 is substantially a cylindrical shell, while the primary cutting edge 5 has an orbit in the shape of two-stepped truncated cones.

The active primary cutting edge 5 can be set up to the part-face transition 14 that delimits the part-face 41 in relation to the part-face 42. This results in a maximum chip removal depth $a_{p\ max}$. In the event of the peeling plate 1 plunging beyond the part-face transition 14 that delimits the part-face 41 in relation to the part-face 42, the (here passive) secondary cutting edge 6 that adjoins thereto would be worn.

As compared to round peeling plates known from the prior art it is particularly advantageous that the contact lengths of the cutting edges, that is to say the length of the cutting edge that actually engages in the workpiece in the case of cutting edges that are formed by linear portions is shorter than in the case of arcuate cutting edges, assuming the same maximum chip removal depth $a_{p\ max}$. A shorter contact length results in lower cutting forces.

As compared to round peeling plates it is furthermore advantageous that the setting angle of the primary cutting edge 5 of the present peeling plate 1 is substantially consistent across the length of the primary cutting edge 5. In the case of round peeling plates, however, the setting angle of the cutting edge in the region of the minimum spacing of the cutting edge from the rotation axis R is almost nil and increases as the radial spacing from the rotation axis R increases. Depending on the chosen cutting depth, a setting angle of approximately 90° can arise in the case of round peeling plates in the region of the exit of the cutting edge from the workpiece. A setting angle that is variable across the length of the cutting edge means non-uniform cutting forces along the length of the cutting edge.

A further disadvantage of arcuate primary cutting edges, as is the case in round peeling plates, are undulated workpiece surfaces. Therefore, an additional finishing plate is necessary for polishing the surfaces in the case of round peeling plates. By contrast, an additional finishing plate is not necessarily required in the case of a peeling plate according to the invention.

Figure 7:
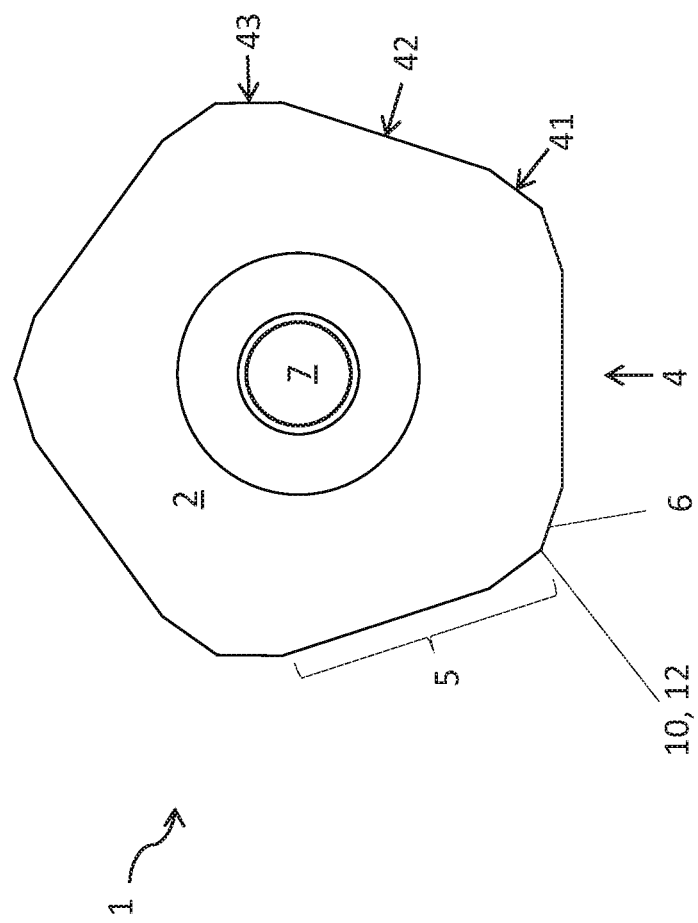
FIG. 7 shows a peeling plate in a further exemplary embodiment.

FIG. 7 shows a peeling plate 1 in a further exemplary embodiment having the design of a substantially regular pentagon in a plan view of the upper side 2. The pentagonal peeling plate 1 has five lateral faces 4, cutting edges being configured at the transition from said five lateral faces 4 to the upper side 2.

The pentagonal peeling plate 1 in the present exemplary embodiment has five pairs of primary cutting edges 5 and secondary cutting edges 6, wherein for the sake of clarity only the conditions pertaining to one pair of a primary cutting edge 5 and a secondary cutting edge 6 are illustrated.

An active primary cutting edge 5 is spaced apart from the active secondary cutting edge 6 by way of a cutting corner 12. The maximum external angle of the part-faces (facets) 41, 42, 43 is 216°, the external angle preferably being 190°.

In a variant that is usable in a double-sided manner, cutting edges are also configured at the transition from the lateral faces 4 to the lower side 3. If in each case five pairs of primary cutting edges 5 and secondary cutting edges 6 are configured on the upper side 2 and the lower side 3, the pentagonal peeling plate 1 is capable of being indexed 10 times.

In terms of possibilities of the design embodiment (radii, support chamfers, protective chamfers, et cetera) reference is made to the explanations pertaining to the hexagonal exemplary embodiment.

As compared to a hexagonal peeling plate 1, a pentagonal peeling plate 1 has a lower number of independent cutting edges; however a larger maximum cutting depth $a_{p\ max}$ can be achieved at the same external dimensions.

In practice, a larger number of utilizable cutting edges is more interesting than the maximum cutting depth, which is why hexagonal plates are typically preferred.

LIST OF REFERENCE SIGNS USED

1 Peeling plate
2 Upper side
3 Lower side
4 Lateral face
41, 42, 43 Part-faces
5 Primary cutting edge
6 Secondary cutting edge
7 Bore 8, 9 Cutting edge
10 Lateral edge
11 Chip geometry
12 Cutting corner
13 Bearing face
14 Part-face transition
15 Support chamfer
16 Protective chamfer
17 Workpiece
S Symmetry axis
R Rotation axis
$a_{p\ max}$ Maximum cutting depth
$r_0$ Initial radius
$r_1$ Radius after machining

The invention claimed is:

1. A peeling plate, comprising:
a plate body having an upper side surface, an opposite lower side surface, a lateral surface extending between the upper side and the lower side, a central bore extending between the upper side surface and the lower side surface, and a symmetry axis, said symmetry axis extending through a center of the central bore;
the lateral surface including:
n lateral faces extending between said upper side surface and said lower side surface, n being five or six; and
n lateral surface corner edges, which respectively separate each of the n lateral faces from one another;
each of the n lateral faces including:
a first part-face extending parallel to the symmetry axis;
a second part-face extending parallel to the symmetry axis;
a third part-face extending parallel to the symmetry axis; and
a respective part-face transition surface located between each of the following:
the first part-face and the second part-face; and
the second part-face and the third part-face;
a first external angle is formed between the first part-face and the second part-face, the first external angle being greater than 180° and less than 220°, a second external angle is formed between the second part-face and the third part-face, the first external angle and the second external angle are equal;
said upper side surface, in a plan view thereof, having a shape of either a substantially regular pentagon or a substantially regular hexagon;
n cutting edges located at an intersection of the lateral surface and the upper side surface, each cutting edge has successively:
a primary cutting edge;
a corner cutting edge; and
a secondary cutting edge;
each of the n cutting edges located, respectively, with the n lateral faces in the following manner:
the primary cutting edge being defined by an intersection between the upper side surface and both of the second part-face and the third part-face of one lateral face of the n lateral faces, the primary cutting edge spans both of the second part-face and the third part-face of the one lateral face;
a support chamfer of the second part-face of the one lateral face defines the primary cutting edge along the second part-face;
the corner cutting edge being defined by an intersection between the upper side surface and one of the n lateral surface corner edges; and
the secondary cutting edge being defined by an intersection between the upper side surface and the first part-face of a neighboring lateral face of the n lateral faces;
the upper side surface defining an upper plane perpendicular to the symmetry axis, none of the n cutting edges extend above the upper plane in a direction from the lower side surface to the upper side surface; and
the peeling plate exhibiting an n-fold symmetry about the symmetry axis.

2. The peeling plate according to claim 1, wherein n equals six.

3. The peeling plate according to claim 1, wherein each secondary cutting edge has a length of ⅙ to ½ of a length of each primary cutting edge respectively.

4. The peeling plate according to claim 1, wherein each primary cutting edge is linear and/or each secondary cutting edge is linear.

5. The peeling plate according to claim 1, wherein the first external angle is 190°.

6. The peeling plate according to claim 1, configured as a reversible double-sided peeling plate.

7. The peeling plate according to claim 6, comprising n cutting edges located at an intersection of the of the lateral surface and the lower side surface, each cutting edge including successively:
a lower primary cutting edge;
a lower corner cutting edge; and
a lower secondary cutting.

8. The peeling plate according to claim 1, comprising a chip removal geometry formed on at least one of said upper side or said lower side.

9. The peeling plate according to claim 1, wherein each primary cutting edge is round cutting edge having a curvature radius of greater than 50 mm.

10. The peeling plate according to claim 1, wherein each secondary cutting edge has a curvature radius of greater than 50 mm or each secondary cutting edge is a linear cutting edge.

11. An assembly, comprising a tool holder and at least one peeling plate each according to claim 1 mounted to said tool holder.

* * * * *